P. J. A. STOCKMANN.
WEIGHING MACHINE.
APPLICATION FILED OCT. 2, 1909.
976,228.
Patented Nov. 22, 1910.
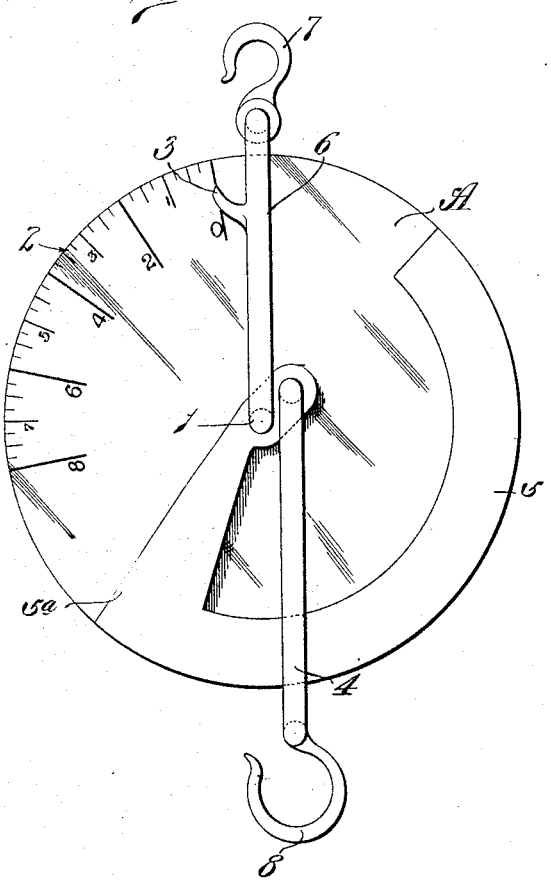
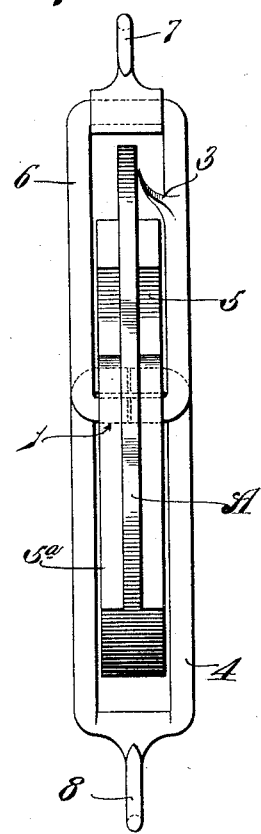
Witnesses:
Geo. R. Ladson.
Wells L. Church.
Inventor:
Peter J. A. Stockmann.
By Paul Bakewell
Atty.
THE NORRIS PETERS CO., WASHINGTON, D. C.

UNITED STATES PATENT OFFICE.

PETER J. A. STOCKMANN, OF ST. LOUIS, MISSOURI.

WEIGHING-MACHINE.

976,228. Specification of Letters Patent. Patented Nov. 22, 1910.

Application filed October 2, 1909. Serial No. 520,693.

*To all whom it may concern:*

Be it known that I, PETER J. A. STOCKMANN, a citizen of the United States, residing at St. Louis, Missouri, have invented a certain new and useful Improvement in Weighing-Machines, of which the following is a full, clear, and exact description, such as will enable others skilled in the art to which it appertains to make and use the same.

This invention relates to weighing machines.

The main object of my invention is to provide a weighing machine of improved construction which will automatically indicate the weight of the object being weighed.

Briefly described, my improved weighing machine consists of an oscillating member arranged in an approximately vertical plane and provided with a scale that is adapted to coöperate with a pointer or similar device to indicate the weight of the object being weighed, means eccentrically connected to said oscillating member for supporting the object to be weighed, and an approximately semi-circular-shaped counterbalancing device on the oscillating member that automatically establishes a state of equilibrium between the oscillating member and the object being weighed, said counterbalancing device being so arranged that the zero mark on the scale is located opposite the pointer or indicator when the machine is not in use.

Figure 1 is a side elevational view of a weighing machine constructed in accordance with my invention; and Fig. 2 is an end elevational view of said machine.

Referring to the drawings which illustrate one form of my invention, A designates an oscillating member arranged in an approximately vertical plane and loosely mounted on a horizontally disposed pin or pivot 1 which forms the axis about which the member A turns. The member A is approximately disk-shaped and is provided adjacent its peripheral edge with a scale 2 that coöperates with a pointer or indicator 3 carried by a member which is stationary with respect to the oscillating member. A device 4 that supports the object or article to be weighed, is eccentrically connected to the member A so as to cause said member to turn on its axis whenever a weight is imposed upon said device 4, and an approximately semi-circular or segmental-shaped weight 5 is connected to the member A to counterbalance the weight of the object being weighed. This weight 5 is so proportioned and designed that the zero mark on the scale will be located opposite the pointer 3 when the machine is not in use but as soon as a load is placed on the member 4 the member A will turn on its axis far enough to establish a perfect balance between the weight 5 and the load on the device 4, the scale 2 on the member A coöperating with the pointer 3 to indicate the weight of the load on the device 4.

In the construction herein shown the pin or pivot 1 which forms the axis of the member A, is carried by a yoke 6, and said yoke is connected to an eye or other suitable support, not shown, by means of a hook 7, thereby causing the member A and yoke 6 to always hang in a perfectly vertical position. The device 4 which supports the load also preferably consists of a yoke which embraces the oscillating member A and the weight 5 thereon so that the weight will not strike against the device 4. The device 4 is provided at its lower end with a hook 8 on which the object being weighed can be placed. The weight 5 is distributed equally on opposite sides of the oscillating member A, and is provided with an extension or arm $5^a$ that projects inwardly toward the axis of the member A, thereby producing a structure in which part of the weight normally lies at one side of the load-supporting device 4 and another part of the weight lies on the other side of said device. If desired, the arm or extension $5^a$ on the weight can be made long enough to pass through the center of the member A and a trifle to one side of said center so that the pivot pin 1 and the upper end of the load-supporting device 4 will pass through said extension. While I have herein shown an approximately disk-shaped oscillating member I do not wish it to be understood that my invention is limited to this exact construction for my broad idea could be embodied in various other types of scales than the one herein shown.

A weighing machine of this construction automatically indicates the weight of the object being weighed, it comprises few parts, and is of such simple construction that it is not apt to get out of order; and as the weight never strikes against the load-supporting device the machine can be so designed that it will weigh very heavy articles. I prefer to employ an oscillating member that is approximately disk-shaped or at least circular shape but this is not absolutely essential as the member which carries the scale could be formed in various other ways to accomplish the same results.

Having thus described my invention, what I claim as new and desire to secure by Letters Patent is:

1. In a weighing machine, a semi-ring-shaped weight provided at one of its ends with a radially disposed arm or extension which projects inwardly toward the center of the axis about which the weight turns, a pivot for said weight located adjacent the inner end of said arm, a load-supporting device eccentrically connected to said arm beyond said pivot, and means for indicating the movement of said weight so as to determine the weight of the load on said device.

2. In a weighing machine, a weight comprising an arm that is provided at its outer end with a laterally projecting ring-shaped portion, a pivot arranged adjacent the inner end of said arm, a load-supporting device connected to the extreme inner end of said arm or to the part of said arm that extends beyond said pivot, and means for showing the movement of said weight when a load is imposed on said device so as to indicate the weight of said load.

3. In a weighing machine, an oscillating member, a load-supporting device eccentrically connected to said member, and a semi-ring-shaped weight arranged adjacent the periphery of said member and in such a manner that portions thereof lie on opposite sides of the load-supporting device.

4. In a weighing machine, an oscillating member, a load-supporting device eccentrically connected to said member, a semi-ring-shaped weight connected to said member adjacent the outer edge thereof and provided with an extension that projects inwardly toward the pivot of said member, and coöperating stationary and movable means for indicating the movement of said oscillating member so as to indicate the weight of the load on the load-supporting device.

5. In a weighing machine, an oscillating member provided with scale graduations, a semi-circular-shaped weight connected to said member adjacent the periphery thereof and provided at one end with a radially-disposed arm that projects inwardly toward the axis of said member, a load-supporting device eccentrically connected to said oscillating member at such a point that portions of said weight lie on opposite sides of the vertical plane in which said load-supporting device lies, and a pointer coöperating with the scale graduations on said oscillating member for indicating the weight imposed on said load-supporting device.

6. In a weighing machine, an oscillating member, a segmental-shaped weight arranged on the opposite faces of said member and provided at one end with a radially disposed arm that projects inwardly beyond the axis of said member, a load-supporting device embracing said member and weight and connected to the inner end of said arm at a point eccentric to the axis of said member, and a yoke-shaped supporting device carrying the pivot of said member.

In testimony whereof I hereunto affix my signature in the presence of two witnesses, this thirtieth day of September 1909.

PETER J. A. STOCKMANN.

Witnesses:
WELLS L. CHURCH,
GEORGE BAKEWELL.